United States Patent [19]

Clendinning et al.

[11] 3,919,163

[45] Nov. 11, 1975

[54] BIODEGRADABLE CONTAINERS

[75] Inventors: Robert A. Clendinning, New Providence; James E. Potts, Millington; Walter D. Niegisch, Watchung, all of N.J.

[73] Assignee: Union Carbide Corporation, New York, N.Y.

[22] Filed: July 15, 1974

[21] Appl. No.: 488,499

Related U.S. Application Data

[62] Division of Ser. No. 275,972, July 28, 1972, Pat. No. 3,852,913.

[52] U.S. Cl. ............... 260/40 R; 47/37; 47/DIG. 7; 260/33.2 R; 260/835; 260/842; 260/850; 260/857 PE; 260/858; 260/873; 260/DIG. 43
[51] Int. Cl.² ............... A01C 11/02; C08G 63/02
[58] Field of Search ......... 260/40 R, 835, 842, 850, 260/857 PE, 858, 873, 33.2 R, DIG. 43; 47/37, DIG. 7

[56] References Cited

UNITED STATES PATENTS

| 2,688,209 | 9/1954 | Adams | 47/37 |
| 3,632,687 | 1/1972 | Walter et al. | 260/896 |
| 3,636,956 | 1/1972 | Schneider | 260/78.3 |
| 3,734,979 | 5/1973 | Koleske et al. | 260/897 |
| 3,741,918 | 6/1973 | Koleske et al. | 260/2.5 |

OTHER PUBLICATIONS

"Polymer Preprints," Vol. 13, No. 2, pp. 629–634, Potts et al. rec'd 7/15/72.

Chem. Tech., July, 1971, pp. 409–415, Rodriquez.

"Applied Microbiology," Vol. 16, No. 6, pp. 900–905, Darby et al.

*Primary Examiner*—Eugene C. Rzucidlo
*Attorney, Agent, or Firm*—J. J. O'Connell

[57] ABSTRACT

Shaped containers fabricated from material comprising biodegradable thermoplastic oxyalkanoyl polymers, e.g., epsilon-caprolactone polymers, said containers possessing a medium to germinate and grow seed or seedling, and optionally, a seed or seedling in such medium.

15 Claims, No Drawings

BIODEGRADABLE CONTAINERS

This is a division of application Ser. No. 275,972 filed July 28, 1972, now U.S. Pat. No. 3,852,913.

This invention relates to new and useful improvements in transplanter containers.

In the seed and nursery indusries, it is the practice of the horticulturist to plant seeds or seedlings in soil or conditioned material which is contained in relatively small containers, such as metal cans or clay pots, so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period. A major disadvantage, however, of such containers is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system and results in damage thereto.

In the regeneration of forests it is the practice of the silviculturist to employ, for the most part, bare-root planting methods. Though it is estimated that well over one billion bare-root tree seedlings are planted annually in North America, the bare-root planting method is fraught with disadvantages. A formidable obstacle to the silviculturist is the rapidity of physical deterioration of the bare-root stock. Reforestation is beset with labor problems, antiquated tools, and dated concepts of planting. In this respect the article published in the Forest Products Journal, Volume 19, No. 10 (October 1969) is worth noting. In this article, the author John Walters, states the following, "Today, forestry like other industries, is faced with a labor force that is declining not only in numbers but in its tolerance to the tedium and monotony of crude tools. Coincidental to the decline of the manual labor force, enlarged planting programs are being planned that will place an intolerable strain on labor and economic resources. As a consequence, there is an urgent need for the development and testing of planting systems adaptable to principles of total mechanization in which nursery and planting projects can be carried out without hand labor."

The silviculturist has very recently turned to experimenting with container planting methods. In this regard, new shapes and types of containers and accessory equipment for growing and planting seedlings have been devised. One method involves the mechanical metering of containerized seedlings into the terrain. The equipment utilized is a "planting gun" in which the container, in the shape of a "bullet", is placed into the planting gun, passed through the gun muzzle, and then mechanically inserted into the ground. The bullet can be fabricated from material such as polystyrene and is quite rigid in construction. To permit root egress of the seedling from such bullet to the surrounding soil after planting, the walls of the bullet are weakened by strategically located grooves, splits, and/or holes. Unfortunately, there are drawbacks to the transplanter container method briefly described above. The plastic container or bullet is not biodegradable, that is, it is not consumed or substantially consumed by the action of microorganisms such as fungi and bacteria. Not only does this non-biodegradability factor represent an ecological problem, but also interference of the root system by the container wall results in damage and stunted growth of the seedling.

Accordingly, one or more of the following objects will be achieved by the practice of the invention.

It is an object of the invention to provide a novel biodegradable transplanter container which is capable of maintaining the shape and strength of the container during the initial growth of a plant. Another object of the invention is to provide an improved transplanter container which is fabricated from a thermoplastic oxyalkanoyl polymer, said container having sufficient mechanical strength to contain the medium in which the seed or seedling is planted and having the further characteristic of being capable of undergoing substantial biodegradation when planted in the field. Another object of the invention is to provide an improved biodegradable shaped article which contains a germination medium with/without seed or seedling therein. A yet further object of the invention is to provide a novel article of manufacture comprising a biodegradable thermoplastic container, a germination medium, and a seed or seedling therein, said container having the capability of maintaining its shape during the initial growth period of a plant whereby the entire container and its contents can be transplanted, by hand or mechanical means, to the field or to a larger container without disturbing or damaging the root system. Other objects will become apparent to those skilled in the art in the light of the specification.

A broad aspect of the invention is directed to novel articles of manufacture in the form of shaped containers which are fabricated from material(s) comprising biodegradable thermoplastic oxyalkanoyl polymers, said containers possessing a medium to germinate and grow seed or seedling, and optionally, a seed or seedling in such medium. The containers of this invention have certain characteristics which produce worthwhile and ecological advantages over prior art containers. Firstly, the container of this invention can be made by the various techniques employed in the thermoplastic forming arts, e.g., compression molding, extrusion, injection molding, etc. Secondly, the integrity and mechanical strength of the container are sufficient to retain its shape during the initial growth period or until the transplanting occurs. After the initial growth period, the container including its contents and seedling can be transported from the nursery and mechanically inserted into the ground. Thirdly, the container is fabricated from material(s) which is consumed by microorganisms, e.g., fungi, as evidenced by substantial loss of weight and strength properties, e.g., impact strength, tensile strength, etc., thus affording desirable root egress for the seedling. Containers from thermoplastic oxyalkanoyl polymers such as thermoplastic oxycaproyl homopolymer possess a novel combination of retention of strength and shape in wet environment with the further advantage of subsequent biodegradation by microorganisms. In contrast, other biodegradable products such as paper containers readily lose strength and shape in a wet environment.

Strictly speaking, biodegradable materials are those which, because of their chemical structure, are susceptible to being assimilated by microorganisms such as molds, fungi, and bacteria, when buried in the ground or otherwise contacted with the organisms under conditions conducive to their growth. The term "biodegradable" is often used indiscriminately to refer to various types of environmental degradation, including photodegradation. Though a polymeric material may be degraded by sunlight and oxygen this does not necessarily mean that the material will also be assimilated by microorganisms. The term "biodegradable", as used herein, is reserved for that type of degradability which is brought about by living organisms, usually microorganisms.

The container of the invention can be fabricated from biodegradable thermoplastic oxyalkanoyl polymers, or mixtures of such polymers with other substance such as normally-solid condensation polymers, normally-solid addition polymers, fillers, and the like. In various embodiments, there can also be included with the material used in the fabrication of the container ingredients such as plasticizers, dyes, fertilizers, insecticides, pesticides, herbicides, water-soluble polymers, and the like. By these means, there is made available containers having built-in characteristics and/or utilities.

The thermoplastic oxyalkanoyl polymers which are suitable in the practice of the invention possess a reduced viscosity value of at least about 0.1 and upwards to about 12, and higher. In various desirable embodiments thermoplastic oxyalkanoyl polymers which have a wide span of usefulness are those which possess a reduced viscosity value in the range of from about 0.2 to about 8. In the fabrication of transplanter containers having high utility in, for example, silvicultural and agricultural applications, the preferred thermoplastic oxyalkanoyl polymers possess a reduced viscosity value in the range of from about 0.25 to about 3. These polymers are further characterized in that they contain at least about 10 weight percent, desirably greater than about 20 weight percent of the oxyalkanoyl unit,

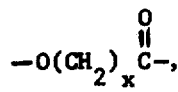

recurring therein, wherein x is an integer having a value of 2,3, and 5-7 preferably 5. In the practice of highly suitable embodiments of the invention, the thermoplastic oxyalkanoyl polymers contain at least about 60 weight percent, and preferably at least about 80 weight percent, and upwards to about 100 weight percent of the oxycaproyl unit, i.e.,

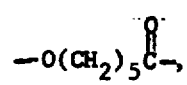

recurring therein.

The aforesaid recurring unit is interconnected through the oxy group (-O-) of one unit with a carbonyl group

of a second unit. In other words, the interconnection of such units does not involve the direct bonding of two carbonyl groups,

When the thermoplastic oxyalkanoyl polymer is a homopolymer or essentially a homopolymer, the polymer chain thereof consists essentially of interconnected recurring oxyalkanoyl units. In addition to the recurring oxyalkanoyl unit, the thermoplastic oxyalkanoyl polymer may comprise other moieties or groups therein especially those which intersperse or terminate the polymeric chain thereof as illustrated by the oxyalkylene group,

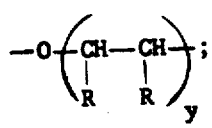

group; the

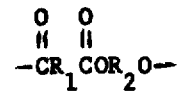

group;

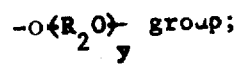

group; the

group; the

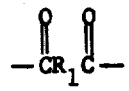

group; the urethane group,

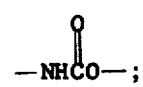

the

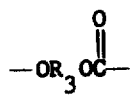

group; the

group; the biuret group,

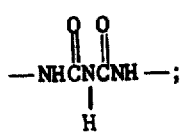

the

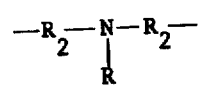

group;
the divalent mono- and polyaromatic rings including fused and bridged rings; lower alkyl substituted oxalkanoyl groups; catalyst residue; the carbonate group,

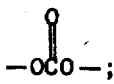

and others. With reference to the aforesaid groups or moieties, the variables R, $R_1$, $R_2$, $R_3$, and $y$ can be illustrated as follows: R represents hydrogen or lower alkyl; $R_1$ represents a divalent hydrocarbon group; $R_2$ represents a divalent aliphatic hydrocarbon group or a divalent aliphatic oxa-hydrocarbon group; $R_3$ represents a divalent aliphatic hydrocarbon group; and $y$ represents an integer which has a value of at least one.

The term "lower alkyl", as used herein, represents a monovalent aliphatic hydrocarbon group having 1 to 4 carbon atoms, e.g., methyl, ethyl, propyl, isopropyl, n-butyl, etc. The term "divalent hydrocarbon group", as used herein, includes radicals such as $C_1$–$C_{12}$alkylene, $C_2$–$C_{12}$alkylidene, and $C_6$–$C_{12}$arylene, e.g., methylene, propylene, butylene, hexamethylene, heptamethylene, cyclohexylene, phenylene, naphthylene, propylidene, butylidene, etc. The term "divalent aliphatic hydrocarbon group", as used herein, includes $C_2$–$C_{12}$alkylene and $C_2$–$C_{12}$alkylidene. The term "divalent aliphatic oxa-hydrocarbon group", as used herein, can be represented by the empirical formula, —$C_2$—$C_{12}$alkylene(oxy$C_2$—$C_{12}$alkylene–)$_y$. The variable $y$, as used herein, represents an integer having a value of at least one.

As previously noted, the thermoplastic oxycaproyl polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30°C.

The thermoplastic oxyalkanoyl polymers can be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogen-containing group, at an elevated temperature, preferably in the presence of a catalyst, and for a period of time sufficient to produce the desired polymers. By carefully controlling the purity and molar ratio of lactone reactant to organic initiator, there can be produced "initiated" poly(oxyalkanoyl) polymers whose number average molecular weight can range from several hundred to above 100,000. Organic initiators which can be employed include primary diamines, secondary diamines, mixed primary-secondary diamines, aminoalcohols, diols, dicarboxylic acids, hydroxycarboxylic acids, aminocarboxylic acids, etc. Such organic initiators are voluminously illustrated in the literature, e.g., U.S. Pat. Nos. 3,169,945 and 3,427,346. Catalysts which can be employed include, for instance, stannous octanoate, tetrabutyltitanate, dibutyltin dilaurate, and the like. A temperature in the range of from about 150°C to about 250°C for periods ranging upwards to about 24 hours, and longer, are suitable.

Thermoplastic oxycaproyl polymers can also be prepared by reacting the cyclic ester, e.g., epsilon-caprolactone, and/or the corresponding hydroxy-acid, e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. It is highly desirable that free diol or free dicarboxylic acid not be present at the termination of the polyesterification reaction. The water of esterification which results during the reaction can be removed via conventional techniques. The diols and dicarboxylic acids which are particularly suitable include those illustrated by the formulae HO—$R_2$O—)$_y$H and HOOCR$_1$COOH such as ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalic acid, and the like.

In the absence of added organic initiator, the thermoplastic oxyalkanoyl polymers can be prepared by polymerizing a lactone reactant, e.g., betapropiolactone, delta-valerolactone, epsilon-caprolactone, etc., in the presence of anionic catalysts such as di-n-butylzinc, tri-n-butylaluminum, diethylmagnesium, aluminum triisopropoxide n-butyllithium, dimethylcadmium, and the like. The reaction is desirably conducted at an elevated temperature, e.g., 100°C to 250°C, for periods of time ranging from minutes to several hours, e.g., from about 10 minutes to about 24 hours. The reaction mixture can comprise, in addition to the lactone reactant, minor quantities of other polymerizable cyclic monomers such as tetramethylene carbonate, methyl-epsilon-caprolactone, keto-dioxane, etc. The number average molecular weight of the resulting polymeric products which are produced by this exemplified "noninitiated" method are, in general, quite high. For example, products which have number average molecular weights ranging from about 10,000 to several hundred thousands can be prepared. The patent literature, e.g., U.S. Pat. Nos. 3,021,309 to 3,021,317, discusses in detail the preparation of these polymers.

Thermoplastic oxyalkanoyl polymers can also be prepared by polymerizing an admixture of $C_7$–$C_9$lactone, a vicinal epoxy compound, e.g., ethylene oxide, propylene oxide, butylene oxide, cyclohexene oxide, etc., and an interfacial agent such as a solid, relatively high molecular weight poly(vinyl) stearate) or lauryl methacrylate/vinyl chloride copolymer (reduced viscosity in cyclohexanone of from about 0.3 to about 1.0), in the presence of an inert normally-liquid saturated aliphatic hydrocarbon vehicle such as heptane, using phosphorus pentafluoride as the catalyst therefor, and in the absence of an active hydrogen-containing organic initiator, at an elevated temperature, e.g., about 80°C, and for a period of time sufficient to produce such polymers.

Thermoplastic oxyalkanoyl polymers can also be prepared by reacting a molar excess of a lactone with a polyoxyalkylene diol which has a molecular weight ranging from about 400 to about 20,000 under conditions discussed supra with reference to the "initiated" poly(oxyalkanoyl) polymers. Illustrative of the polyoxyalkylene diols which are contemplated include the poly(oxyethylene) diols, the poly(oxypropylene) diols, and the poly(oxyethyleneoxypropylene) diols. The resulting polymers can be considered, in effect, to be ABA block polymers in which the A portions represent a polyoxyalkanoyl segment or block and in which the B portion represents a polyoxyalkylene segment or block. The number average molecular weight of these ABA block polymers can range upwards to 50,000, and higher, depending on the molecular weight of the polyoxyalkylene diol reactant and the molar ratio of the lactone reactant to polyoxyalkylene diol reactant employed and consumed in the process. By using mono end-blocked polyalkylene diols such as the monoalkyl ether of polyoxyalkylene diol, the above discussed preparation results in polymers having an AB block configuration.

Oxyalkanoyl polymers which can be considered to be "graft" polymers can be prepared by the addition of $C_6$–$C_9$ lactone at the active hydrogen sites, e.g., hydroxyl or amino, which are pendant along the polymeric chain of so-called vinyl polymers. Such vinyl polymers may, for example, be obtained by the copolymerization of ethylene and vinyl acetate, followed by subsequent saponification of the acetate groups to yield polymers which are characterized by a plurality of pendant hydroxyl groups along the polymeric chain thereof. A wide host of ethylenically unsaturated monomers can be employed to prepare the vinyl polymers and include, for example, 2-hydroxyethyl acrylate, 2-hydroxy methacrylate, styrene, acrylonitrile, propylene, vinyl chloride, and the like. The choice of the ethylenically unsaturated monomers are such that the resulting polymer contains a plurality of pendant hydroxyl groups, or groups which can be converted to hydroxyl groups. The addition of the $C_6$–$C_9$ lactone at the active hydrogen site will produce "graft" polymers of number average molecular weights upwards to approximately 100,000, and higher.

The oxyalkanoyl polymers which have number average molecular weights of, for example, less than 25,000 are characterized by functional end groups. For instance, hydroxyl-terminated polymers can be prepared from a diol initiator and epsiloncaprolactone using molar ratios of lactone to initiator upwards to about 100:1. If desired, these polymers may be reacted with a diisocyanate, e.g., 1,6-hexamethylene diisocyanate, 2,4- and/or 2,6-tolylene diisocyanate, bis(4-isocyanatophenyl)methane, bis(4-isocyanatocyclohexyl)methane, etc., to extend the polymeric chain, or such hydroxyl-terminated polymers as well as their polyurethane extension products can be reacted with so-called "chain stoppers" such as a monocarboxylic acid or anhydride. As indicated previously, the thermoplastic oxyalkanoyl polymers which are suitable in the practice of the invention have, as its lower limit, a reduced viscosity value of at least about 0.1

In the practice of suitable embodiments of the invention the biodegradable thermoplastic oxyalkanoyl polymer can be combined with other substances to fabricate containers having "tailor-made" or "built-in" properties or characteristics. Such substances include, for example, plastic materials such as normally-solid condensation polymers, normally-solid addition polymers, fillers, plasticizers, dyes, etc. Thermoplastic oxyalkanoyl polymers as exemplified by high molecular weight epsilon-caprolactone homopolymer, unlike other plastics such as the polyethylenes and the polystyrenes, readily accept high loadings of fillers (carbon black, silica, talc, etc.) thus increasing the stiffness or modulus of containers fabricated from such "filled" polymers. Moreover, the cost of such containers has been reduced markedly. The addition of rubbery material such as natural rubber to the thermoplastic oxyalkanoyl polymer can increase the impact strength and/or elongation characteristics of containers fabricated therefrom. Containers fabricated from mixtures comprising biodegradable thermoplastic oxyalkanoyl polymer and water-soluble polymers, e.g., wax-like and solid water-soluble ethylene oxide homopolymers and copolymers, have the ability to undergo relatively slow dissolution or leaching in an aqueous or humid surrounding to thus provide a more favorable environment for growth of fungi.

Illustrative of the plastic material which can be combined with the thermoplastic oxyalkanoyl polymer include the normally-solid condensation and addition polymers which are produced during the polymerization process without the evolution of lowmolecular weight by-products as well as those which are produced during the polymerization process with the evolution of low molecular weight by-products, e.g., water, alcohol, hydrogen chloride, etc. Types and/or classes of plastic materials include, for example, the polyimides, the polyureas, the polyurethanes, the polyureides, the polyanhydrides, the polyethers, the polyalkenes, the polylactams, the polycarbonates, the nitrile rubber gum stocks, the polybutadiene rubber gumstocks, the styrene/butadiene rubber gumstocks, the phenolic resins, the epoxy resins the melamine resins, the aminoplasts, and the like. It should be understood that the term "polymer", as used herein, is employed in its generic sense to include homopolymers and copolymers.

Typical plastics include the poly(hydroxy ether) polymers which are formed by the polymerization of aliphatic and aromatic polyhydroxy compounds, e.g., alcohols and phenols, with an epihalohydrin. Another class of polymers is the thermoplastic polycarbonates which are derived from dihydroxy compounds or phenols and phosgene. Another class of polymers is the polyamides, such as nylon 6, e.g., polycaprolactam; nylon 6/6, e.g., hexamethylenediamine-adipic acid or anhydride polycondensate; nylon 6/10, e.g., hexamethylenediamine-sebacic acid or anhydride polycondensate; nylon 11, e.g., 11-aminoundecanoic acid polycondensate; and the like. Yet another class is the normally-solid polyoxyalkylene polymers, both unsubstituted and halogenated. The lowest homologous type of this class is the polyoxymethylene polymers, otherwise called acetal resins. In addition, the normally-solid polyoxyethylene, polyoxypropylene, and polyoxybutylene polymers and copolymeric forms such as the poly(oxyethyleneoxypropylene) copolymers, the poly(oxymethyleneoxyethylene) copolymers, and the poly(oxymethyleneoxypropylene) copolymers which have a block or random distribution can be employed as an additive thermoplastic component. Illustrative of the thermoplastic polyurethanes include those which are formed from the toluene diisocyanates (TDI) or diphenylmethane 4,4-diisocyanate (MDI) and a wide range of polyols such as polyoxyethylene glycol, polyoxypropylene glycol, polyoxyethyleneoxypropylene glycols, etc. Polyureas which are suitable include thermoplastic solids having recurring units of the formula: —$\vdash$NHR"NHCONHR"NHCO—$\dashv$— wherein R" is alkylene or arylene having 2 to 12 carbon atoms.

Illustrative of the normally-solid addition polymers include those prepared via the vinyl polymerization of olefinically unsaturated monomers, e.g., monomers having the group

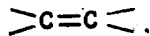

such as ethylene, propylene, the butylenes, styrene, vinyl acetate, fumaric acid, ethyl acrylate, mixtures thereof, and the like. The polymers include, for example, the various normally-solid alkene homopolymers and copolymers such as the high and low density polyethylenes, the polypropylenes, and polybutylenes, the polystyrenes, and the like.

As indicated previously, fillers can be employed in fabricating the containers of the invention. Such fillers can be illustrated by particulate polymers such as polyethylene, polystyrene, etc., and other particulate materials such as kaolin, bentonite, iron oxide, clay, carbon black, lamp black, silica, titanium dioxide, asbestos, vermiculite, metallic powders, calcium carbonate, calcium sulfate, powdered glass, mica, and the like. The filler, if employed, is desirably in particulate form or of small particle size. Particulate polymers are desirably kept in particulate form during processing and fabricating by remaining below the melting point of the particulate polymer or by crosslinking the particulate polymer either chemically or by radiation treatment known in the art.

The optimum composition of the container will depend, to a significant extent, upon a consideration of factors such as the thermoplastic oxyalkanoyl polymer of choice; the presence and kind of other plastics and/or fillers, if any; the rate and degree of biodegradability which are desired for the intended use; the geometry of the container; e.g., its dimensions, shape, and design; over-all economics especially raw material and fabrication costs; and others.

Though biodegradability is oftentimes manifest when at least about 10 percent of the total weight of the container per se is in the form of oxyalkanoyl units, especially oxycaproyl units, it is desirable that the container be fabricated from material comprising thermoplastic oxyalkanoyl polymer so that at least about 20 percent of the weight of the fabricated container per se is in the form of oxyalkanoyl units. For example, the container can be fabricated from a thermoplastic oxycaproyl polymer or a mixture of such polymers with/without the inclusion of other materials such as normally-solid condensation polymers, normally-solid addition polymers, fillers, plasticizers, dyes, etc., provided that at least about 10 weight percent, desirably about 20 weight percent, of the container per se is attributable to oxycaproyl units. In general, containers suitable in the practice of the invention can be fabricated from the following recipe:

| Component | Parts by Weight |
|---|---|
| (i) Thermoplastic oxyalkanoyl polymer | ~10–100 |
| (ii) Plastic additive, e.g., condensation and/or addition polymers | 0–90 |
| (iii) Filler | 0–90 |
| TOTAL | 100 |

It is thus possible to fabricate highly "loaded" biodegradable containers from recipes which contain upwards to about 90 weight percent, based on the total recipe weight, of fillers which are fibrous materials such as fiber glass, asbestos, vermiculite, rockwool, synthetic fiber, etc. Such fibrous materials are characterized by a relatively low surface to volume ratio.

Containers having a notable degree of biodegradability and usefulness in horticultural and silvicultural applications can be fabricated from the following recipe:

| Component | Parts by Weight |
|---|---|
| (i) Thermoplastic oxyalkanoyl polymer | ~20–100 |
| (ii) Plastic additive | 0–80 |
| (iii) Filler | 0–80 |
| TOTAL | 100 |

Highly suitable biodegradable containers having, if desired, "built-in" or "tailor-made" characteristics and properties can be fabricated by utilizing the following recipe:

| Component | Parts by Weight |
|---|---|
| (i) Thermoplastic oxycaproyl polymer | ~20–90 |
| (ii) Plastic additive | ~10–80 |
| (iii) Filler | 0–70 |
| TOTAL | 100 |

Taking into account costs of raw materials and commercial considerations highly useful containers can be fabricated from the recipe noted below:

| Component | Parts by Weight |
|---|---|
| (i) Thermoplastic oxycaproyl polymer | ~20–90 |
| (ii) Filler | ~10–70 |
| (iii) Plastic additive | 0–70 |
| TOTAL | 100 |

As indicated previously, thermoplastic oxycaproyl polymers which contain greater than about 50 weight percent of recurring oxycaproyl units are desirable for use in the fabrication of the containers. It is preferred that such polymers contain at least about 60 weight percent, and preferably still at least about 80 percent, and upwards to about 100 weight percent of oxycaproyl units therein.

Various techniques known to the art can be used to fabricate the containers of the invention and include, for instance, compression molding, injection molding, transfer molding, extrusion, vacuum forming, blow molding, film casting, calendering, rotations, molding, dipping, laminating, spraying, coating, and the like. By way of illustrations, the container can be fabricated from plastics shaped into net, web, and/or chicken-wire type configurations, in which the voids are filled and the plastic is coated with thermoplastic oxyalkanoyl polymer as by spraying, dipping, laminating, coating, etc., operations. The container can also be fabricated from plastic film or sheet to which a coating or layer of thermoplastic oxyalkanoyl polymer is applied to one or both sides of the plastic film or sheet as by spraying, coating, dipping, laminating, etc., operations.

When using a blend comprising thermoplastic oxyalkanoyl polymer, suitable equipment for fluxing the blend include Banbury mixers, screw extruders, two-roll or multi-roll mills, ribbon or paddle blendors, calenders, and the like. The time of blending or fluxing is not narrowly critical. The blending time should be sufficient to obtain a substantially uniform blend. If desired, sufficient heat can be applied in the blending step to melt the thermoplastic oxyalkanoyl polymer and other plastics. One can also employ a blend of materials in which the thermoplastic oxyalkanoyl polymer represents the continuous phase and particulate plastic additive or/and filler is dispersed therein. Blends of this latter type can be conveniently prepared by recognizing and utilizing the melting points of the thermoplastic oxyalkanoyl polymer and such particulate plastic. For example, epsilon-caprolactone homopolymer which has a reduced viscosity of about 0.7 (number average molecular weight of approximately 40,000) is characterized by a melting point of about 60°C. Numerous other normally-solid plastics have melting points exceeding 60°C. One can form an admixture comprising epsiloncaprolactone homopolymer and particulate normally-solid plastic, then heat the resulting admixture to a temperature above the melting point of said homopolymer but below the melting point of said particulate plastic thereby obtaining particulate polymer in a continuous phase of such homopolymer.

The container of the invention can be of any size and shape capable of having utility in horticultural, silvicultural, and agricultural applications. It can be in the form of a flower pot, cone, bullet, tube, cylinder, tray, etc. It should be capable of holding the germination medium therein. In this connection additional support or reinforcement material can be used. For instance, a container shaped in the form of a hollowed tube, opened at both extremities, may not be suitable in holding the germination medium in its interior. This drawback can be overcomed by stoppering one end of such tube with suitable plugging means, if necessary. If the container is to be used in mechanical transplantation methods, it is desirable that the container has sufficient strength properties to withstand breakdown or failure during the transplanting operation. In this respect, one can use, if desired, containers which are characterized by a modulus range of from about 12,000 psi, and lower, to about 1,000,000 psi (as determined by ASTM Method D-638). On the other hand, containers characterized by a much lower modulus can be tolerated in hand planting techniques, e.g., at least about 300 psi. It is to be understood that the aforementioned values are merely illustrative and that higher and lower values are contemplated as being within the scope of the invention.

The containers possess a medium to germinate and grow seed or seedlings, and optionally, the seed or seedlings in such medium. Any mixture suitable for growing plant life such as farm products, flowers, shrubs, trees, grass, etc., can serve as a germination medium. The germination medium can be formed from synthetic materials, substances found in nature, or mixtures of both. A desirable germination medium comprises soil formed from disintegrated and decomposed rocks and minerals generally mixed with organic matter in various stages of decay, and having substantial porosity or pore space. The pore space will vary with the texture of the soil. The soil may comprise silt, sand, clay, stone, gravel, minerals, organic matter, etc. Conditioners and stabilizers can be added to or contained in the soil and they include, for example, gypsum, calcium chloride, limestone, vermiculite, iron sulfate, watersoluble high molecular weight polymeric electrolytes, and others. Nutrients can be added to the soil to aid plant growth and to supplement the plant-food content thereof. The more important ones include the compounds of nitrogen, phosphorous, and potassium. Trace elements such as magnesium, iron, zinc, copper, etc., have been shown to be beneficial to plant growth and can be added to the soil. Various types of fertilizers provide useful nutrients. They can range from inorganic compounds as illustrated by ammonium nitrate types to organic compounds such as the long lasting ureaforms which release the nitrogen slowly.

Any type of seed or seedling capable of growing in soil is contemplated in the practice of the invention. Of special interest are tree seeds and seedlings as illustrated by the deciduous and coniferous types such as oak, ash, maple, elm, Douglas Fir, pine, spruce, cedar, etc; shrub seedlings as illustrated by ornamental or evergreen types such as taxus, holly, juniper, etc.; plants and flowers of the various well-known varieties; and the like.

In the illustrative Examples hereinafter disclosed, numerical references in the copolymer designate parts by weight. For example, 67 ethylene/33 vinyl acetate refers to a copolymer containing 67 parts by weight of ethylene and 33 parts by weight of vinyl acetate chemically combined therein.

By the terms "biodegradable" and "biodegradability", as used herein, are meant that the container of the invention is capable of being consumed by microorganisms as, for example, bacteria or fungi, in an environment suitable to the growth of microorganisms such that there results a weight loss of at least approximately 20 weight percent in the biodegradable component(s) used in the fabrication of the container within a period of about four years, and generally within about 2 years. The degree and rate of container biodegradability depend, to a significant extent, on the weight percent oxyalkanoyl content, especially oxycaproyl content, in the container, and the presence or absence of biodegradable additives, fillers, plasticizers, etc., therein. As will be apparent from the Examples hereinafter, containers fabricated from thermoplastic epsilon-caprolactone homopolymer and subjected to soil burial tests were readily consumed by microorganisms to the extent that such containers evidenced a loss of weight of upwards to about 95 percent within one year.

EXAMPLES 1–24

In Examples 1–24 infra, samples of commercially available high molecular weight polymers were pressed or molded into plaques from which test specimens were cut. These specimens were tested for degradation by fungi using ASTM - D-1924-63[1]. This procedure requires the placement of test specimens in or on a solid agar growth medium that is deficient only in carbon. The medium and specimens are inoculated with the test microorganisms and incubated for three weeks. Any growth which may occur is dependent on the utilization of a component of the specimen as a carbon source by the test organism. The test fungi consisted of a mixture of Aspergillus niger, Aspergillus flavus, Chaetomium globosum, and Penicillium funiculosum. Since possible complication that growth may occur as a result of the presence of additives in the polymeric specimen, it was necessary that the polymeric specimen tested be free from stabilizers, plasticizers, lubricants, and other extraneous organic substances, or that the presence of such additives be recognized. If a pure polymeric specimen showed heavy growth and concurrent loss of weight and mechanical properties this was considered good evidence of its biodegradability.

[1]ASTM-D-1924: Recommended practice for determining resistance of synthetic polymeric materials to fungi. Ann. Book of ASTM Standards, 1970, Part 24, page 593.

After various exposure times up to three weeks, and longer, the samples were examined and assigned growth ratings as shown below:

Growth Ratings:

0 = No Growth
1 = Traces (Less than 10% Covered)
2 = Light Growth (10 to 30% Covered)
3 = Medium Growth (30 to 60% Covered)
4 = Heavy Growth (60 to 100% Covered)

The pertinent data are set out in Table I below.

TABLE I

| Sample No. | Commercial Thermoplastic | Growth Rating |
|---|---|---|
| 1 | Acrylonitrile/Butadiene/Styrene Terpolymer (ABS)[(a)] | 0 |
| 2 | Blend of ABS and Poly(Bisphenol A Carbonate)[(b)] | 0 |
| 3 | Butadiene/Acrylonitrile Rubber[(c)] | 0 |
| 4 | 72/Styrene/28 Acrylonitrile Copolymer | 0 |
| 5 | Poly(Methyl Methacrylate)[(d)] | 0 |
| 6 | Poly(Ethylene Terephthalate)[(e)] | 0 |
| 7 | Poly(Cyclohexanedimethanol Terephthalate)[(f)] | 0 |
| 8 | Poly(Bisphenol A Carbonate)[(g)] | 0 |
| 9 | Poly(4-Methyl-1-Pentene) | 0 |
| 10 | Polyisobutylene[h] | 0 |
| 11 | Chlorosulfonated Polyethylene[(i)] | 0 |
| 12 | Cellulose Acetate[(j)] | 0 |
| 13 | Cellulose Butyrate[(k)] | 0 |
| 14 | Nylon-6; Nylon-6/6; Nylon-12 | 0 |
| 15 | Poly(Vinyl Butyral) | 0 |
| 16 | Polyformaldehyde[(l)] | 0 |
| 17 | Poly(Vinyl Ethyl Ether); $I_r$=4 | 0 |
| 18 | Poly(Vinyl Acetate); $I_r$=0.8 | 1 |
| 19 | Poly(Vinyl Acetate), 50% Hydrolyzed to Poly(Vinyl Alcohol) | 1 |
| 20 | High Density Polyethylene, 31,600 M.W. | 0 |
| 21 | High Density Polyethylene, 52,500 M.W. | 0 |
| 22 | High Density Polyethylene, 97,300 M.W. | 1 |
| 23 | Low Density Polyethylene, 21,000 M.W. | 1 |
| 24 | Low Density Polyethylene, 28,000 M.W. | 0 |

[(a)]Kralastic K2938 by Uniroyal, Inc.
[(b)]Cycoloy by Borg Warner Corp.
[(c)]Hycar 1002 by B. F. Goodrich Co.
[(d)]Lucite by E. I. duPont de Nemours & Co.
[(e)]Arnite by Polychem AKU-GE, Holland
[(f)]Kodel by Eastman Kodak Co.
[(g)]Lexan 101 by General Electric Co.
[(h)]Vistanex by I. G. Farben
[(i)]Hypalon (29% Cl) by E. I. duPont de Nemours & Co.
[(j)]Tenite (036A3719748) by Eastman Kodak Co.
[(k)]Tenite (233A22300H2) by Eastman Kodak Co.
[(l)]Celcon by Celanese Corp.

EXAMPLES 25-30

Various high molecular weight thermoplastic ethylene copolymers were tested for biodegradability in the manner set out in Examples 1-24 supra. The pertinent data are noted in Table II below.

TABLE II

| Sample No. | Ethylene Copolymer | Growth Rating |
|---|---|---|
| 25 | 67 Ethylene/33 Vinyl Acetate | 1 |
| 26 | 55 Ethylene/45 Vinyl Acetate | 1 |
| 27 | 30 Ethylene/70 Vinyl Alcohol | 0 |
| 28 | 70 Ethylene/30 Vinyl Alcohol | 0 |
| 29 | 85 Ethylene/15 Acrylic Acid | 0 |
| 30 | 82 Ethylene/18 Ethyl Acrylate | 0 |

EXAMPLES 31-40

Several relatively low molecular weight thermoplastic copolymers of ethylene and different vegetable oils were tested for biodegradability in the manner set out in Examples 1-24 supra. These copolymers were carefully purified before testing to remove unreacted vegetable oil. The pertinent data are noted in Table III below.

TABLE III

| Sample No. | Ethylene/Vegetable Oil Copolymer | Growth Rating |
|---|---|---|
| 31 | 74 Ethylene/26 Castor Oil | 0 |
| 32 | 72 Ethylene/28 Linseed Oil | 0 |
| 33 | 73 Ethylene/27 Safflower Oil | 0 |
| 34 | 73 Ethylene/27 Soybean Oil | 0 |
| 35 | 59 Ethylene/41 Neat Foot Oil | 0 |
| 36 | 80 Ethylene/20 Peanut Oil | 0 |
| 37 | 81 Ethylene/19 Rapeseed Oil | 0 |
| 38 | 84 Ethylene/16 Olive Oil | 0 |
| 39 | 82 Ethylene/18 Corn Oil | 0 |
| 40 | 91 Ethylene/9 Oleic Acid | 0 |

EXAMPLES 41-50

Since high molecular weight thermoplastic polystyrene evidenced a Growth Rating of zero, various high molecular weight thermoplastic copolymers of styrene were prepared and tested in the manner indicated in Examples 1-24 supra. As seen in Table IV below, thermoplastic copolymers of styrene and one or more comonomers such as acrylic acid, sodium acrylate, ethyl acrylate, dibutyl maleate, and dimethyl itaconate, were resistant to attack by the microorganisms. The pertinent data are noted in Table IV infra.

TABLE IV

| Sample No. | Copolymer | Reduced Viscosity | Growth Rating |
|---|---|---|---|
| 41 | 84 Styrene/16 Acrylic Acid | 0.9[(a)] | 0 |
| 42 | 84 Styrene/16 Sodium Acrylate | — | 0 |
| 43 | 85 Styrene/10 Acrylic Acid/ 5 Dibutyl Maleate | 0.5[(a)] | 0 |
| 44 | 85 Styrene/10 Acrylic Acid/ 5 Dimethyl Itaconate | 0.5[(a)] | 0 |
| 45 | 70 Styrene/30 Dimethyl Itaconate | 0.3[(a)] | 0 |
| 46 | 50 Styrene/50 Ethyl Acrylate | 0.6[(b)] | 0 |
| 47 | 85 Styrene/15 Bis(2-Ethylhexyl) Fumarate | 0.5[(c)] | 0 |
| 48 | 13 Styrene/87 Methacrylonitrile | — | 0 |
| 49 | 85 Styrene/15 Dodecyl Acrylate | 0.4[(a)] | 0 |
| 50 | 85 Styrene/10 Ethyl Acrylate/ 5 Dodecyl Acrylate | 0.4[(a)] | 0 |

[(a)]Measured in dimethylformamide, 0.2 g/100 ml at 30°C.
[(b)]Measured in acetone, 0.2 g/100 ml at 30°C.
[(c)]Measured in benzene, 0.2 g/100 ml at 30°C.

EXAMPLES 51-56

Various polymers were tested for biodegradability in the manner indicated in Examples 1-24 supra. The results are documented in Table V below.

TABLE V

| Sample No. | Polymer | Reduced Viscosity | Growth Rating |
|---|---|---|---|
| 51 | Epsilon-Caprolactone Homopolymer | 0.7 | 4 |
| 52 | Epsilon-Caprolactone Homopolymer | 0.3 | 4 |
| 53 | Pivalolactone Homopolymer | 0.1 | 0 |
| 54 | Poly(Ethylene Terephthalate) | high | 0 |
| 55 | Poly(Cyclohexanedimethanol Terephthalate) | high | 0 |
| 56 | Thermoplastic Polyoxycaproyl Polyurethane[a] | high | 4 |

[a] Reaction of diethylene glycol initiated poly-(epsilon-caprolactone) diol of 2000 molecular weight with bis(4-isocyanatophenyl)methane using an NCO/OH ratio equal to one.

EXAMPLE 57

Thermoplastic epsilon-caprolactone homopolymer, reduced viscosity of 0.7, prepared by the reaction of epsilon-caprolactone monomer with diethylene glycol initiator, in the presence of stannous octanoate catalyst, at approximately 200°C., using a molar ratio of monomer to initiator of about 350:1, was chosen for biodegradation testing by the soil burial technique. By injection molding techniques, this homopolymer was molded into tensile bars measuring approximately 6 inches × 0.5 inches × 0.13 inches. Various tensile bars were buried in a mixture of equal parts of New Jersey garden soil, Michigan peat moss, and builders sand. At intervals of 1.25, 2.0, 4.0, 6.0 and 12.0 months, tensile bars were removed, tested for tensile strength and elongation, and weight loss measured. With increasing period of time of soil burial, the tensile bars became more pitted and eroded. At the end of six and twelve months the bars were too weak to measure strength properties and had lost 25 and 42 percent, respectively, of their original weight. The pertinent data are set out in Table VI below.

TABLE VI

| Months of Burial | Tensile Strength[a] p.s.i. | % Elongation[a] | % Wt. Loss |
|---|---|---|---|
| 0 | 2610 ± 103 | 369 ± 59 | 0 |
| 1.25 | 1890 ± 215 | 9 ± 1.4 | (b) |
| 2.0 | 1610 ± 180 | 7 ± 2.0 | 8 |
| 4.0 | 520 ± 220 | 2.6 ± 1.1 | 16 |
| 6.0 | 100 | Negligible | 25 |
| 12.0 | Negligible | Negligible | 42 |

[a] ASTM Method D638-64T
(b) Not Measured

EXAMPLE 58

In lieu of forming tensile bars, the homopolymer of Example 57 was injection molded into containers shaped similar to small flower pots or whisky jiggers. The soil burial tests were then repeated. As Table VII below indicates, the percent weight loss of the containers was greater than the percent weight loss of the tensile bars over the same period of time. This factor is attributable to the greater surface area of the containers to the action of the microorganisms. The percent weight loss data is recorded in Table VII below.

TABLE VII

| Months of Burial | Tensile Strength[a] PSI | % Elongation[a] | % Weight Loss |
|---|---|---|---|
| 0 | >2400 | >300 | 0 |
| 2 | — | — | 12 |
| 4 | — | — | 29 |
| 6 | Negligible | Negligible | 48 |
| 12 | Negligible | Negligible | 95 |

[a] ASTM Method D638-64T

EXAMPLES 59-60

Two normally-solid thermoplastic oxycaproyl graft polymers prepared by reacting epsilon-caprolactone with hydrolyzed ethylene/vinyl acetate copolymer were tested for biodegradability in the manner set out in Examples 1-24 supra. The results are noted in Table VIII below.

TABLE VIII

| Example No. | Graft Polymer | Growth Rating |
|---|---|---|
| 59 | 18 Ethylene/6 Vinyl Alcohol/76 CL[1] | 4 |
| 60 | 36 Ethylene/12 Vinyl Alcohol/52 CL[1] | 4 |

[1] "CL" represents epsilon-caprolactone.

EXAMPLES 61-64

Four normally-solid thermoplastic oxycaproyl graft polymers prepared by reacting epsilon-caprolactone with styrene/2-hydroxyethyl methacrylate copolymer were tested for biodegradability in the manner set out in Examples 1-24 supra. The results are recorded in Table IX below.

TABLE IX

| Example No. | Graft Polymer[a] | Reduced Viscosity | Growth Rating |
|---|---|---|---|
| 61 | 22.5 S/0.5 HM/77 CL | 0.7 | 4 |
| 62 | 67 S/1.0 HM/32 CL | 0.9 | 4 |
| 63 | 78 S/1.0 HM/21 CL | 0.8 | 2 |
| 64 | 89 S/3.0 HM/8 CL | 0.6 | 1 |

[a] The notation S/HM/CL for the graft polymer represents styrene/2-hydroxyethyl methacrylate/epsilon-caprolactone.

EXAMPLES 65-85

In Examples 65-85 various blends of epsilon-caprolactone homopolymer designated as PCL for convenience, reduced viscosity ($I_r$) of 0.7, and other substances were formed by fluxing on a two-roll mill for periods of time ranging from 5 to 20 minutes at temperatures upwards of about 75°C. depending on the softening point of the components comprising the blend. Plaques measuring about 6 inches × 6 inches × 0.04 inches from the blend were then formed via compression molding techniques. Strips measuring approximately 1 inch × 2 inches × 0.04 inches were cut from the plaques. Various strips were buried in a mixture of equal parts of New Jersey garden soil, Michigan peat moss, and builders sand. After two months the strips were removed and measured for weight loss. Various strips were also tested for degradation by fungi using ASTM Method D-1924-63. The pertinent data are noted in Table X below.

using an Instron Tensile Tester. In this modification a one inch specimen is used and stretched at a rate of 0.2

TABLE X

| Example No. | Composition of Blend | Growth[j] Rating | Modulus[k] x 10³ psi | Izod[l] Impact | Weight Loss 2 Months | Weight Loss 4 Months |
|---|---|---|---|---|---|---|
| 65 | 80 PCL/20 Polyoxyethylene Diol 20M(a) | 4 | 72 | 0.35 | 33 | 48 |
| 66 | 80 PCL/20 Fiberglas | 4 | 253 | 1.33 | 6.8 | 22[i] |
| 67 | 60 PCL/40 Polyoxyethylene Diol 20M(a) | 4 | 57 | 0.40 | 54 | (h) |
| 68 | 60 PCL/20 HDPE(b)/20 Polyoxyethylene Diol 20M(a) | 4 | 70 | 0.48 | 23 | 30 |
| 69 | 60 PCL/40 Limestone | 4 | 114 | 0.48 | 11 | 32 |
| 70 | 80 PCL/20 Carbon Black | 4 | 90 | (g) | 5.8 | 17 |
| 71 | 80 PCL/20 HDPE(b) | 4 | 77 | 0.41 | 6.5 | 11 |
| 72 | 80 PCL/20 LDPE(c) | 4 | 58 | (g) | 8.9 | 12 |
| 73 | 80 PCL/20 Talc | 4 | 110 | (g) | 5.2 | 15 |
| 74 | 80 PCL/20 Isotactic Polypropylene | 4 | 91 | 0.46 | 8.1 | 14 |
| 75 | 80 PCL/20 Polyoxyethylene Diol 6000(d) | 4 | 46 | 0.92 | 19.6 | 23 |
| 76 | 50 PCL/50 Sulfur | 4 | 85 | 0.58 | 14.5 | 22 |
| 77 | 80 PCL/20 Styrene | 4 | 104 | 0.36 | 7 | 14 |
| 78 | 70 PCL/15 HDPE(b)/15 Polytone Diol(f) | 4 | 70 | (g) | 7.9 | 18 |
| 79 | 80 PCL/20 Asbestos | 4 | 126 | 0.48 | 9.4 | 22 |
| 80 | 80 PCL/20 Ethylene Oxide Homopolymer(e) | 4 | 67 | (g) | 29.1 | 45 |
| 81 | 60 PCL/20 LDPE(c)/20 Ethylene Oxide Homopolymer(e) | 4 | 50 | (g) | 21.5 | 38 |
| 82 | 80 PCL/20 Polytone Diol(f) | 4 | 57 | (g) | 4.8 | 17 |
| 83 | 60 PCL/20 Polyoxyethylene Diol 20M(a)/20 Thermoplastic Polystyrene | 4 | 68 | 0.44 | 19 | 27 |
| 84 | 80 PCL/20 Limestone | 4 | 81 | 0.55 | 6.4 | 18 |
| 85 | 60 PCL/40 Ethylene Oxide Homopolymer(e) | 4 | 26 | 1.09 | 47 | (g) |

[a]Polyoxyethylene diol of approximately 20,000 number average molecular weight.
[b]HDPE represents high density polyethylene.
[c]LDPE represents low density polyethylene.
[d]Polyoxyethylene Diol 6000 of approximately 6000 number average molecular weight.
[e]Not measured.
[f]Complete disintegration.
[g]Weight loss at 3 months.
[j]Determined in accordance with ASTM Method D-1924-63.
[k]Determined in accordance with ASTM Method D-638.
[l]Determined in accordance with ASTM Method D-256.

EXAMPLES 86-87

Poly(beta-propiolactone) and poly(deltavalerolactone) were tested for biodegradability in the manner indicated in Examples 1-24 supra. The results are noted in Table XI below.

TABLE XI

| Sample No. | Polymer | Reduced Viscosity | Growth Rating[a] |
|---|---|---|---|
| 86 | Beta-Propiolactone Homopolymer | 1.36[b] | 4 |
| 87 | Delta-Valerolactone Homopolymer | 0.48 | 4 |

[a]Determined in accordance with ASTM Method D-1924-63.
[b]Determined 0.2 gram/100cc chloroform.

EXAMPLES 88-89

Thermoplastic beta-propiolactone homopolymer ($I_r$ of 1.36; 0.2 gm/100cc. of chloroform) and deltavalerolactone homopolymer ($I_r$ of 0.48) are tested for biodegradability (ASTM Method D-1924-63). The physical properties of the tested samples are measured by a modified ASTM D882-67 (Method A) procedure using an Instron Tensile Tester. In this modification a one inch specimen is used and stretched at a rate of 0.2 inch per minute to a one percent stretch to obtain the modulus; the same specimen is then stretched at a rate of 2 inches per minute to obtain the stress-strain curve. The pertinent data are shown in Table XII below.

TABLE XII

| Sample No. | Polymer | Growth Rating | Modulus, psi | Tensile Strength, psi | Elongation at Break, % |
|---|---|---|---|---|---|
| 88 | Delta-Valerolactone Homopolymer | 4 | 67,000 | 1,400 | 3.0 |
| 89 | Beta-Propiolactone Homopolymer | 4 | 161,000 | 1,000 | 0.6 |

EXAMPLES 90-91

The thermoplastic beta-propiolactone homopolymer and delta-valerolactone homopolymer described in Examples 88-89 are injection molded into containers designed in the shape of a "bullet" measuring approximately 5 inches in length and one inch in outside diameter at the top. The wall of the bullet is about 1/16 inch in thickness and is weakened by a slit 1/16 inch wide that extends longitudinally from the rim to a hole near the point of the bullet. The hole is about ½ inch long. The containers are filled with a mixture containing equal parts of garden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the bullet size, climate and tree species. After periods of six months and 12 months, normal root structure and normal growth of the tree seedlings are observed. Visual examination of the bullets shows substantial disintegration.

EXAMPLE 92

Thermoplastic epsilon-caprolactone homopolymer ($I_r = 0.7$) per se as well as the blends set out in Examples 65-85 are injection molded into containers designed in the shape of a "bullet" measuring approximately 5 inches in length and one inch in outside diameter at the top. The wall of the bullet is about 1/16 inch in thickness and is weakened by a slit 1/16 inch wide that extends longitudinally from the rim to a hole near the point of the bullet. The hole is about ½ inch long. Using the homopolymer per se, bullets can be injection molded in a multicavity mold, using generally conditions of the order of about 200°F and a pressure of about 9000 psig and a cycle time of approximately 30-90 seconds. With blends, the injection molding conditions are generally higher. The containers are filled with a mixture containing equal parts of garden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the bullet size, climate and tree species. After period of six months and 12 months, normal root structure and normal growth of the tree seedlings are observed. Visual examination of the bullets shows substantial disintegration.

We claim:

1. An article of manufacture which comprises: a. a biodegradable container fabricated from material containing (i) from about 10 to less than 100 weight percent of biodegradable thermoplastic oxyalkanoyl polymer, said polymer having a reduced viscosity value of at least about 0.1 and upwards to about 12 and being further characterized in that at least about 10 weight percent of said thermoplastic oxyalkanoyl polymer is attributable to recurring oxyalkanoyl units of the formula

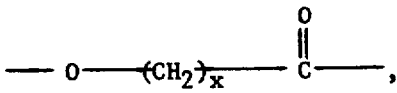

wherein x is an integer having a value of 2 to 7, with the proviso that x does not equal 3; (ii) from more than 0 to about 90 weight percent of a plastic additive, and (iii) from 0 to about 90 weight percent of a filler, based on the weight of said container; and b. a medium to germinate and grow seeds or seedlings in said container.

2. The article of manufacture of claim 1 wherein said recurring oxyalkanoyl units have the formula

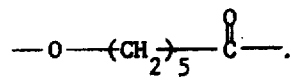

3. The article of manufacture of claim 2 wherein said biodegradable thermoplastic oxycaproyl polymer has a reduced viscosity value of at least about 0.2 to about 8 and is further characterized in that at least about 20 weight percent of said polymer is attributable to the recurring oxyalkanoyl unit shown therein.

4. The article of manufacture of claim 3 wherein at least about 50 weight percent of said polymer is attributable to recurring oxycaproyl units.

5. The article of manufacture of claim 4 wherein at least about 60 weight percent to about 100 weight percent of said polymer is attributable to recurring oxycaproyl units.

6. The article of manufacture of claim 5 wherein at least about 80 to about 100 weight percent of said polymer is attributable to recurring oxycaproyl units.

7. The article of manufacture of claim 5 wherein said polymer has a reduced viscosity value of at least about 0.25 to about 3.

8. The article of manufacture of claim 7 wherein said germination medium contains a seed or seedling therein.

9. The article of manufacture of claim 5 wherein said biodegradable container is fabricated from material containing up to about 80 weight percent of plastic additive, based on the weight of the container per se.

10. The article of manufacture of claim 5 wherein said biodegradable container is fabricated from material containing more than 0 to about 80 weight percent of filler, based on the weight of the container per se.

11. The article of manufacture of claim 6 wherein said biodegradable container is fabricated from material containing up to about 80 weight percent plastic additive and more than 0 to about 80 weight percent of filler, based on the weight of the container per se.

12. The article of manufacture of claim 9 wherein said plastic additive is polyethylene.

13. The article of manufacture of claim 10 wherein said filler is comprised of fibrous material.

14. The article of manufacture of claim 4 wherein said biodegradable container is fabricated from material comprising from about 20 to about 90 weight percent of thermoplastic oxycaproyl polymer, from about 10 to about 80 weight percent of plastic additive, and from 0 to about 70 weight percent of filler, based on the weight of the container.

15. The article of manufacture of claim 4 wherein said biodegradable container is fabricated from material comprising from about 20 to about 90 weight percent of thermoplastic oxycaproyl polymer, from about 10 to about 70 weight percent of filler, and more than 0 to about 70 weight percent of plastic additive, based on the weight of the container.

* * * * *